(12) United States Patent
Ohuchi et al.

(10) Patent No.: US 7,043,827 B2
(45) Date of Patent: May 16, 2006

(54) DEVICE FOR INSTALLING RIVETS ON RIVET HOLDING BODY

(75) Inventors: Masatoshi Ohuchi, Koriyama (JP); Hirokatsu Kobayashi, Koriyama (JP)

(73) Assignee: Opt Engineering Co., Ltd., Fukushima (JP)

( * ) Notice: Subject to any disclaimer, the term of this patent is extended or adjusted under 35 U.S.C. 154(b) by 0 days.

(21) Appl. No.: 10/482,459

(22) PCT Filed: Jul. 4, 2003

(86) PCT No.: PCT/JP03/08534

§ 371 (c)(1),
(2), (4) Date: Dec. 29, 2003

(87) PCT Pub. No.: WO2004/082865

PCT Pub. Date: Sep. 30, 2004

(65) Prior Publication Data

US 2005/0150104 A1  Jul. 14, 2005

(30) Foreign Application Priority Data

Mar. 17, 2003 (JP) ............................ 2003-71593

(51) Int. Cl.
*B23P 19/00* (2006.01)
(52) U.S. Cl. .................. 29/823; 29/809; 29/811.2; 29/243.5; 29/281.4
(58) Field of Classification Search ........... 29/243.5, 29/281.1, 281.4, 793, 809, 811.2, 812.5, 813, 29/823

See application file for complete search history.

(56) References Cited

U.S. PATENT DOCUMENTS

| | | | | |
|---|---|---|---|---|
| 5,123,162 A | * | 6/1992 | Wing et al. | 29/818 |
| 5,172,843 A | * | 12/1992 | Unuma | 226/74 |
| 5,351,392 A | * | 10/1994 | Wing et al. | 29/818 |
| 5,425,473 A | * | 6/1995 | Kvalheim | 221/188 |
| 5,590,459 A | | 1/1997 | Ohuchi et al. | |
| 6,230,395 B1 | * | 5/2001 | Bejerano | 29/753 |

FOREIGN PATENT DOCUMENTS

JP  3-3369  1/1991

(Continued)

*Primary Examiner*—Essama Omgba
(74) *Attorney, Agent, or Firm*—McGlew & Tuttle, P.C.

(57) ABSTRACT

A device for loading a rivet and the like in a rivet holder belt which can continuously and securely load a large number of rivets and the like to the rivet holder belt includes: a hopper 11 for storing the rivets and the like at random; a chute 14 which is continuous from the hopper 11 to guide the rivets and the like that are contained in the hopper 11 to a delivery position of a rivet wheel 15; the rivet wheel 15 which rotates to receive the rivets and the like from the lower end of the chute 14 and store them one by one in each of plural grooves 29 that are formed in the rims of flange bodies; a pushing member 42 which is provided to face the circumference of the rivet wheel 15 to push the rivets and the like resting in the grooves 29 of the rivet wheel 15 into holding notches 37 of a rivet holder belt 36 that is guided along the rivet wheel 15; and a sprocket 35 which is provided in a trunk 27 of the rivet wheel 15 and feeds the rivet holder belt 36 while engaging with engagement holes 38 that are opened along a length of the rivet holder belt 36.

13 Claims, 14 Drawing Sheets

FOREIGN PATENT DOCUMENTS

| | | |
|---|---|---|
| JP | 5-154774 | 6/1993 |
| JP | 2271547 | 4/1994 |
| JP | 7-47441 | 2/1995 |
| JP | 7-151121 | 6/1995 |
| JP | 7-328739 | 12/1995 |
| JP | 2001-200824 | 7/2001 |
| JP | 3364812 | 11/2002 |
| JP | 3435546 | 6/2003 |

* cited by examiner (a)

(b)

DEVICE FOR INSTALLING RIVETS ON RIVET HOLDING BODY

TECHNICAL FIELD

The present invention relates to a device for loading a rivet and the like in a rivet holder belt which is used to continuously load a large number of rivets such as blind rivets or nails in the rivet holder belt.

BACKGROUND ART

For example, in a continuous riveter, blind rivets are loaded in a rivet holder belt, which is set in the continuous riveter to rivet an object with the blind rivets for caulking. Usually, a user purchases a rivet holder belt loaded with blind rivets and uses the belt. The rivet holder belt is for one-time use only and is discarded after the belt is emptied of rivets.

Since disposal after one-time use is not economical, the applicant of the present invention has provided a device which is capable of loading rivets and the like continuously in a rivet holder belt. This device is disclosed in JP 3,364,812 B and JP 3,435,546 B.

This conventional device for loading continuously a rivet and the like in a rivet holder belt (hereinafter abbreviated as conventional device) is equipped with: a hopper for rivets and the like; a rivet wheel; a feed path extending continuously from the hopper to guide the rivets and the like in the hopper to a delivery position of the rivet wheel; a roller or an aligning feeder for dropping the rivets and the like onto the feed path; a member for regulating the rivets and the like; a member for pushing the rivets and the like in; and driving means for the rivet wheel and the roller or the aligning feeder.

This conventional device which is capable of automatically loading rivets and the like in a rivet holder belt is preferable because the device makes it possible for a user to obtain a rivet holder belt loaded with rivets and the like with ease and to recycle a used rivet holder belt.

However, the above conventional device has the following problems to be solved:

(1) The rivet wheel and the rivet holder belt have to be aligned with each other so that a rivet engaging groove of the rivet wheel can meet a holding notch of the rivet holder belt.

(2) The conventional device uses one handle as both driving means for both the roller or the aligning feeder and driving means for the rivet wheel. Therefore, manual adjustment is necessary when the number of rotation of the handle does not match the number of rivets and the like dropped onto the feed path by the roller or the aligning feeder and thus an excess or deficiency is caused.

(3) The pushing member for rivets and the like in the conventional device is of fixed type and therefore has only a small allowance for the axis diameter of rivets and the like. When rivets and the like have different axis diameters, the pushing member cannot handle such rivets and has to be replaced.

(4) The rivet holder belt of the conventional device is transported by friction upon contact with the trunk (shaft) of the rivet wheel. If the trunk of the rivet wheel slips on the rivet holder belt, transportation of the rivet holder belt and rotation of the rivet wheel may fall out of sync with each other and the contact pressure between the trunk of the rivet wheel and the rivet holder belt increases the load on the rivet wheel to slow the rotation of the rivet wheel.

An object of the present invention is to provide a small-sized, easy-to-handle device for loading a rivet and the like in a rivet holder belt which solves those problems in the prior art and which can load continuously a large number of rivets and the like in the rivet holder belt.

DISCLOSURE OF THE INVENTION

A device for loading a rivet and the like in a rivet holder belt according to the present invention includes: a hopper for storing the rivets and the like at random; a chute which is continuous from the hopper to guide the rivets and the like that are contained in the hopper to a delivery position of a rivet wheel; the rivet wheel which rotates to receive the rivets and the like from a lower end of the chute and store the rivets and the like one by one in each of grooves that are formed in rims of flange bodies; a pushing member which is provided to face a circumference of the rivet wheel to push the rivets and the like stored in the grooves of the rivet wheel into holding notches of a rivet holder belt that is guided along the rivet wheel; and a sprocket which is provided in a trunk of the rivet wheel and feeds the rivet holder belt while engaging with engagement holes that are opened along a length of the rivet holder belt. The rivet wheel and the sprocket are placed so that, as regards a positional relation between the grooves of the rivet wheel and teeth of the sprocket, when the engagement holes of the rivet holder belt mesh with the teeth of the sprocket, the grooves of the rivet wheel and the holding notches of the rivet holder belt come into alignment with each other.

Further, a device for loading a rivet and the like in a rivet holder belt according to the present invention includes: a hopper for storing the rivets and the like at random; an aligning feeder which has an aligning slit and which is driven to ascend and descend through the hopper, the aligning slit supporting head portions of the rivets and the like while shanks of the rivets and the like are hung in the aligning slit; a chute which has a slit extending continuous from the aligning slit and guides the rivets and the like downward; a rivet wheel which rotates to receive the rivets and the like from a lower end of the chute and store the rivets and the like one by one in each of grooves that are formed in rims of flange bodies; a pushing member which is provided to face a circumference of the rivet wheel to push the rivets and the like stored in the grooves of the rivet wheel into holding notches of a rivet holder belt that is guided along the rivet wheel; and a sprocket which is provided in a trunk of the rivet wheel and feeds the rivet holder belt while engaging with engagement holes that are opened along a length of the rivet holder belt. The rivet wheel and the sprocket are placed so that, as regards a positional relation between the grooves of the rivet wheel and teeth of the sprocket, when the engagement holes of the rivet holder belt mesh with the teeth of the sprocket, the grooves of the rivet wheel and the holding notches of the rivet holder belt come into alignment with each other.

In the invention as described hereinabove, the rivet holder belt and the rivet wheel rotate integrally and therefore the positions of the holding notches of the rivet holder belt and the positions of the grooves of the rivet wheel can stably be kept synchronized. In this way, rivets and the like can securely be fit in the holding notches of the rivet holder belt.

Also, the rivet wheel can rotate smoothly since the rivet holder belt is fed by the sprocket and the contact pressure (frictional force) between the rivet holder belt and the rivet wheel is small.

The device for loading a rivet and the like in a rivet holder belt according to the present invention is characterized in that the aligning feeder and the rivet wheel are driven by separate driving forces. This makes it possible to feed, securely and at an arbitrary rate, rivets from the chute into the rivet wheel rotated by, for example, manual operation even if the aligning feeder and the rivet wheel operate out of sync with each other.

The device for loading a rivet and the like in a rivet holder belt according to the present invention is characterized in that the aligning feeder is driven by a motor whereas the rivet wheel is driven by manipulation of a handle. This makes it possible to securely fit rivets fed from the aligning feeder in the grooves of the rivet wheel one rivet at a time at an arbitrary rate.

In the invention as described above, the aligning feeder and the rivet wheel are driven by separate driving means. Therefore, even if the number of rotation of, for example, a handle does not match the number of rivets and the like dropped onto the chute by the roller or the aligning feeder, it does not result in an excess or deficiency of rivets and the like.

The device for loading a rivet and the like in a rivet holder belt according to the present invention is characterized by including a regulating member that stretches over an area from a position in a vicinity of the rivet wheel where the rivets and the like are received to a position where the rivets and the like are handed over to the rivet holder belt, the regulating member facing the trunk of the rivet wheel and supporting head portions of rivets and the like that are positioned in the grooves of the rivet wheel and at entrances of the holding notches of the rivet holder belt, regulating positions of the head portions of the rivets and the like to guide the rivets and the like. This makes it possible to guide rivets and the like that have been handed over from the chute to the rivet wheel side while regulating the positions where the rivets and the like are to be loaded in the rivet holder belt. Thus the rivets and the like can be loaded in the rivet holder belt.

The device for loading a rivet and the like in a rivet holder belt according to the present invention is characterized in that the pushing member is provided with a push amount adjusting member for adjusting a push amount by which rivets and the like are to be pushed into the holding notches of the rivet holder belt. This makes it possible to securely fit rivets and the like in the engagement holes of the rivet holder belt at a pushing stroke and pushing pressure suited to the type, size, and the like of the rivet holder belt and of rivets and the like.

As described above, according to the present invention, the sprocket is provided on the circumference of the rivet wheel and engages with the engagement holes opened across the length of the rivet holder belt to thereby feed the rivet holder belt. The rivet holder belt and the rivet wheel therefore rotate integrally and the positions of the holding notches of the rivet holder belt can stably be kept synchronized with the positions of the grooves (holding grooves) of the rivet wheel, thus securely fitting rivets and the like in the holding notches.

In addition, the rivet wheel can rotate smoothly since the rivet holder belt is fed by the sprocket and the contact pressure (frictional force) between the rivet holder belt and the rivet wheel is small.

In addition, using separate driving forces to drive the aligning feeder and the rivet wheel makes it possible to feed, securely and at an arbitrary rate, rivets from the chute into the grooves of the rivet wheel rotated by, for example, manual operation even if the aligning feeder and the rivet wheel operate out of sync with each other.

The aligning feeder is driven by a motor whereas the rivet wheel is driven by manipulation of a handle. Therefore, rivets can securely be fed from the aligning feeder to the grooves of the rivet wheel one by one.

The aligning feeder and the rivet wheel are driven by separate means. Therefore, even if the number of rotation of a handle does not match the number of rivets and the like dropped onto the chute by the aligning feeder, it does not result in an excess or deficiency of rivets and the like supplied to the rivet wheel.

The regulating member stretches over the area from a position in the vicinity of the rivet wheel where rivets and the like are received to the position where rivets and the like are handed over to the rivet holder belt to face the trunk of the rivet wheel, and supports head portions of rivets and the like that are positioned in the grooves of the rivet wheel and at the entrance of the holding notches of the rivet holder belt to regulate the positions of the head portions to guide the rivets and the like. Accordingly, the holding notches of the rivet holder belt and the grooves (holding grooves) of the rivet wheel can be guided to positions where the holding notches and the grooves receive rivets. The regulating member also makes it possible to load rivets and the like in the rivet holder belt while always keeping the rivets and the like in given positions and to fit the rivets and the like in those holes smoothly.

The push amount adjusting member for adjusting a push amount by which rivets and the like are to be pushed into the holding notches of the rivet holder belt is provided at the position around the rivet wheel where rivets and the like are handed over to the rivet holder belt. This provides such an effect that rivets and the like can appropriately be fit in the holding notches of the rivet holder belt at a pushing stroke and pushing pressure suited to the type, size, and the like of the rivet holder belt and of rivets and the like.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BEST MODE FOR CARRYING OUT THE INVENTION

Figure 1:
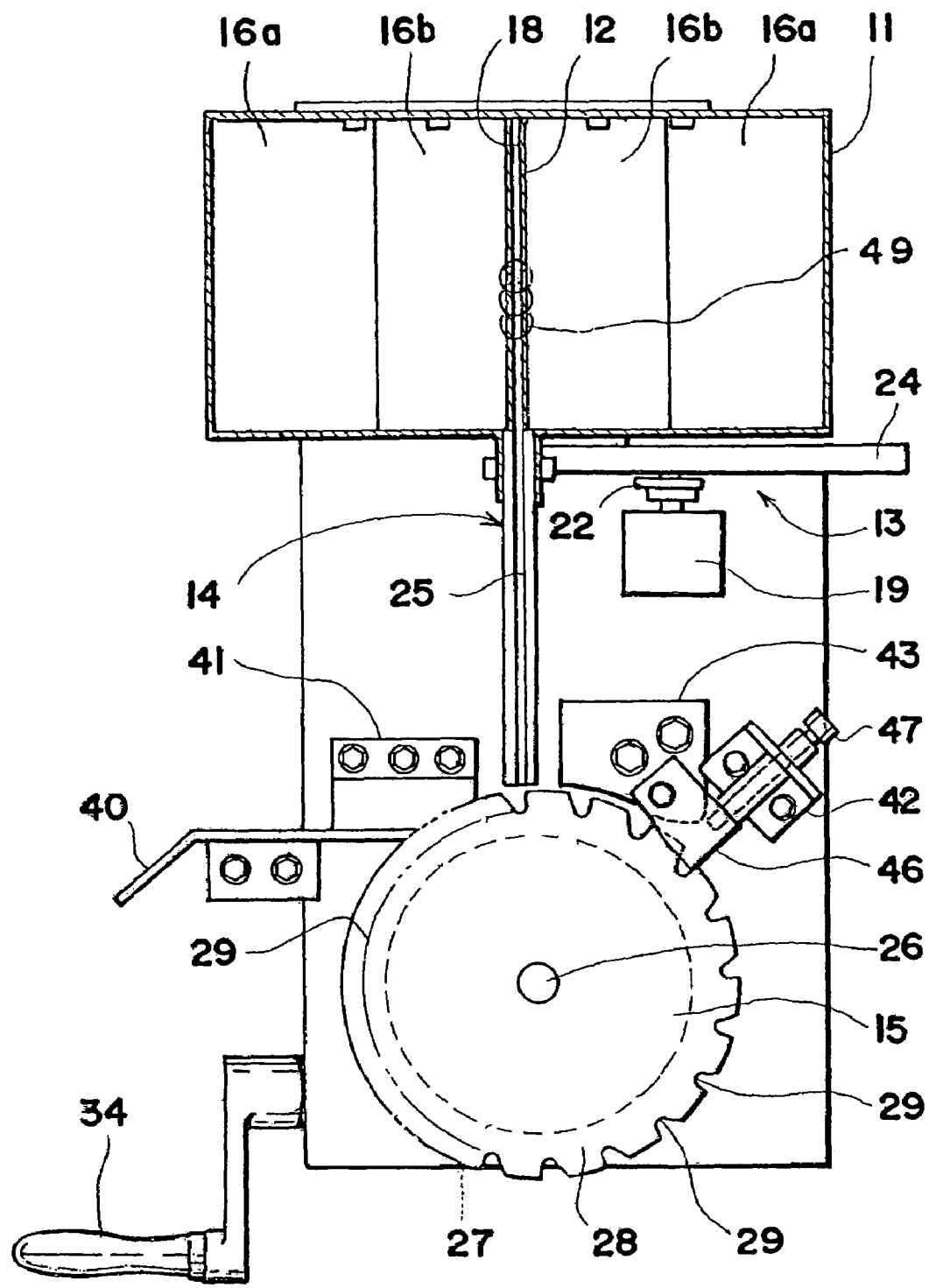
FIG. 1 is a plan view showing a device for loading a rivet and the like in a rivet holder belt according to the present invention.
Figure 2:
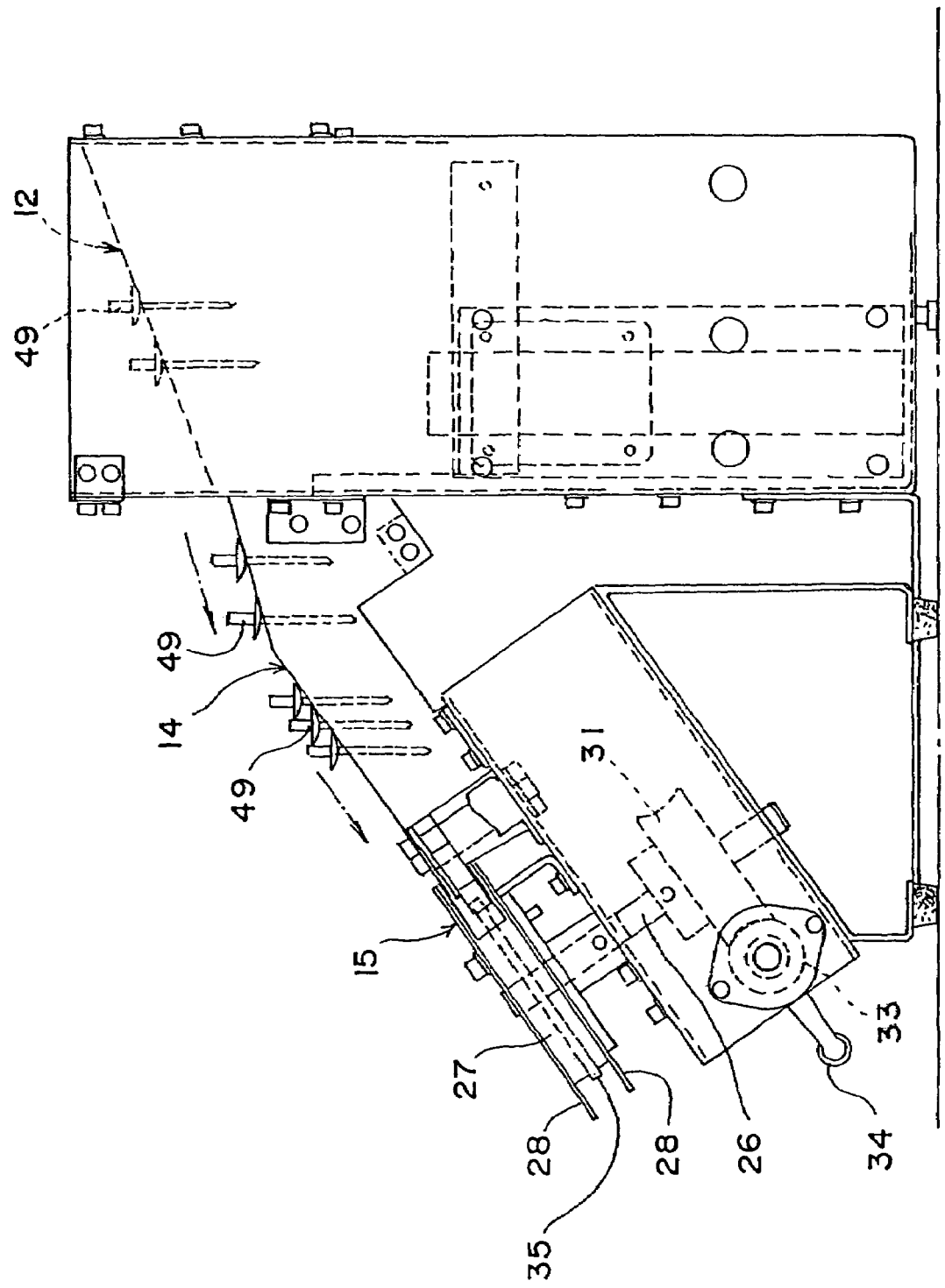
FIG. 2 is a side view showing the device for loading the rivet and the like in the rivet holder belt according to the present invention.
Figure 3:
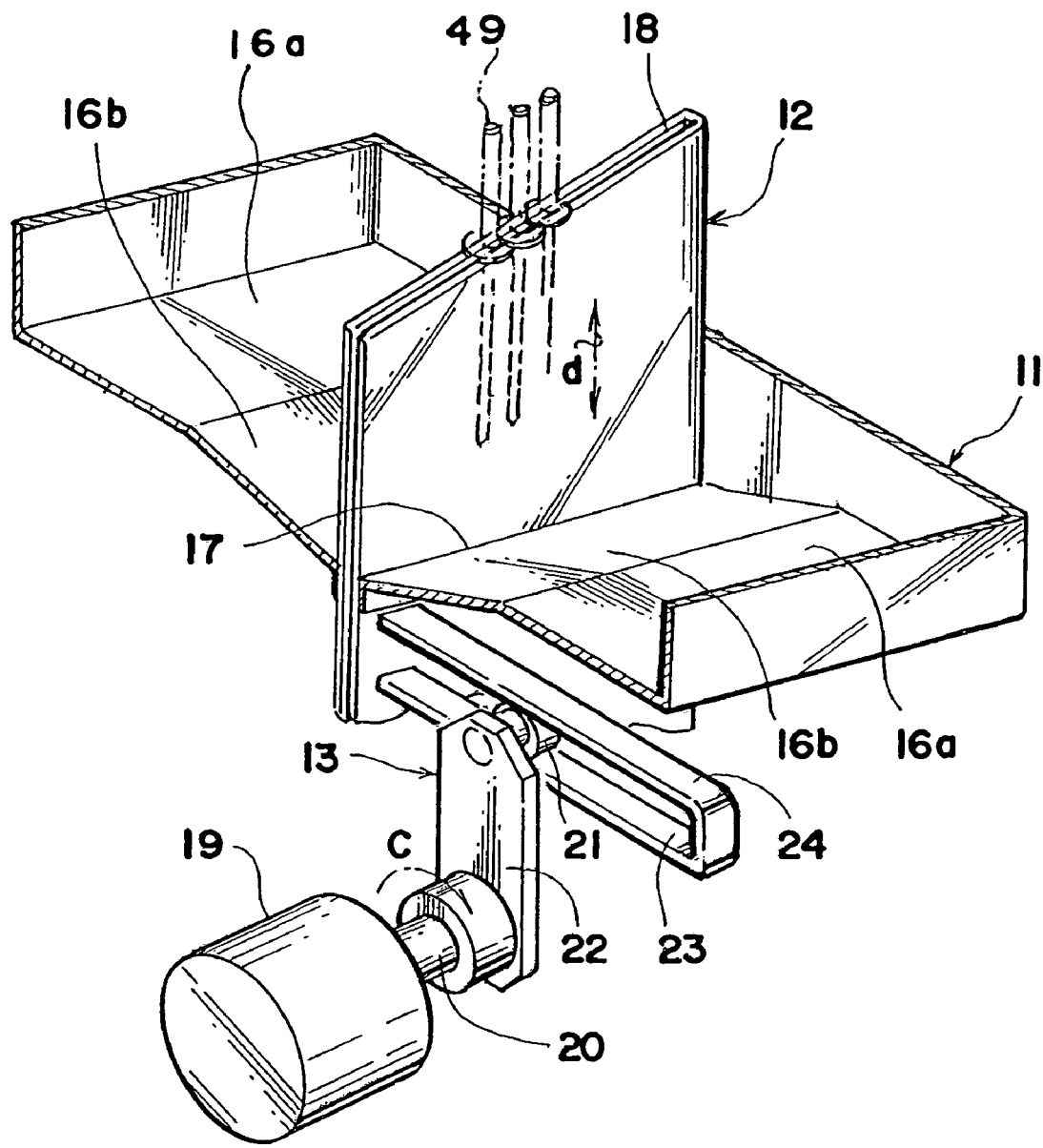
FIG. 3 is a perspective view showing a device for aligning and supplying rivets and the like of FIG. 1.
Figure 4:
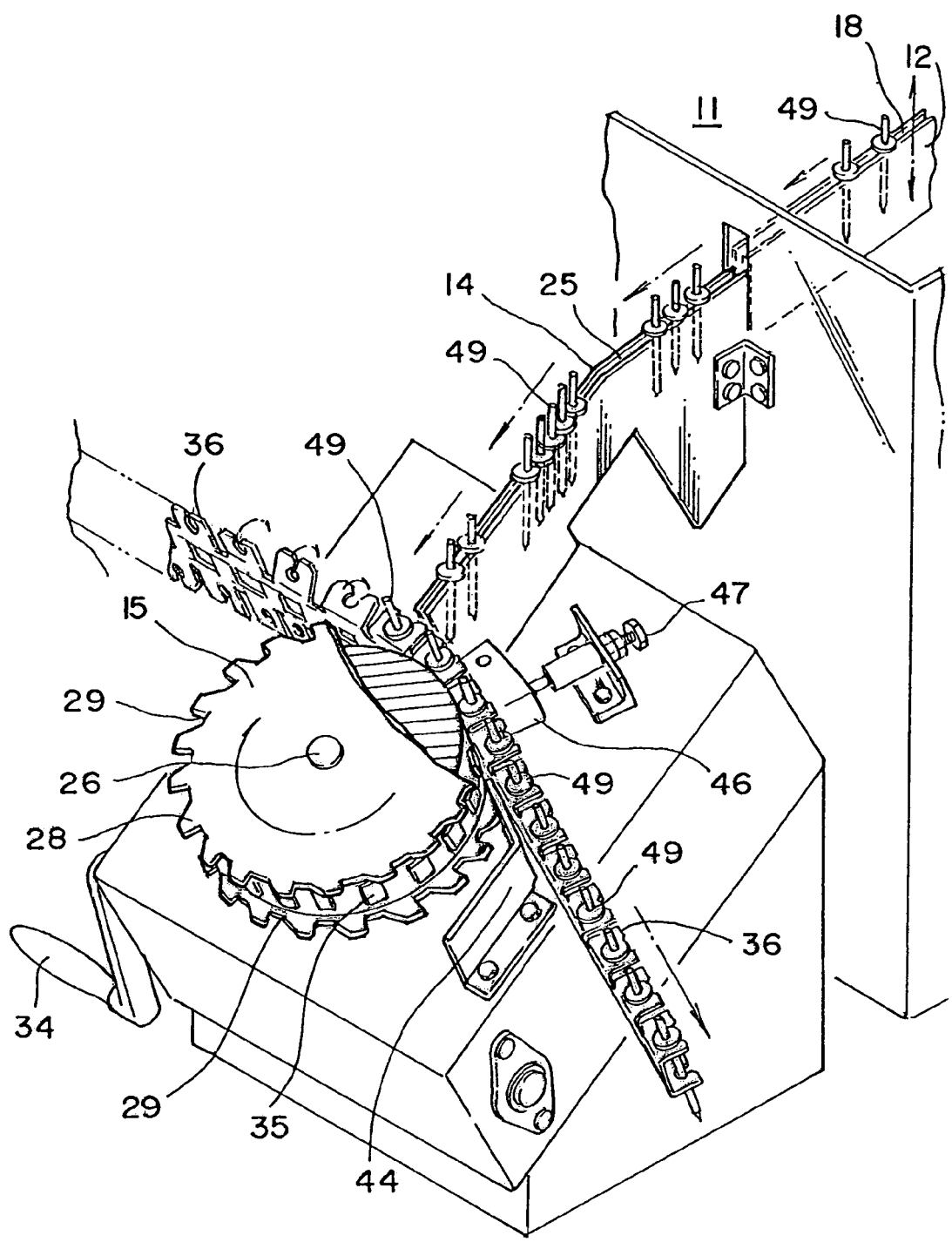
FIG. 4 is a perspective view showing main parts of chute and rivet wheel portions.
Figure 5:
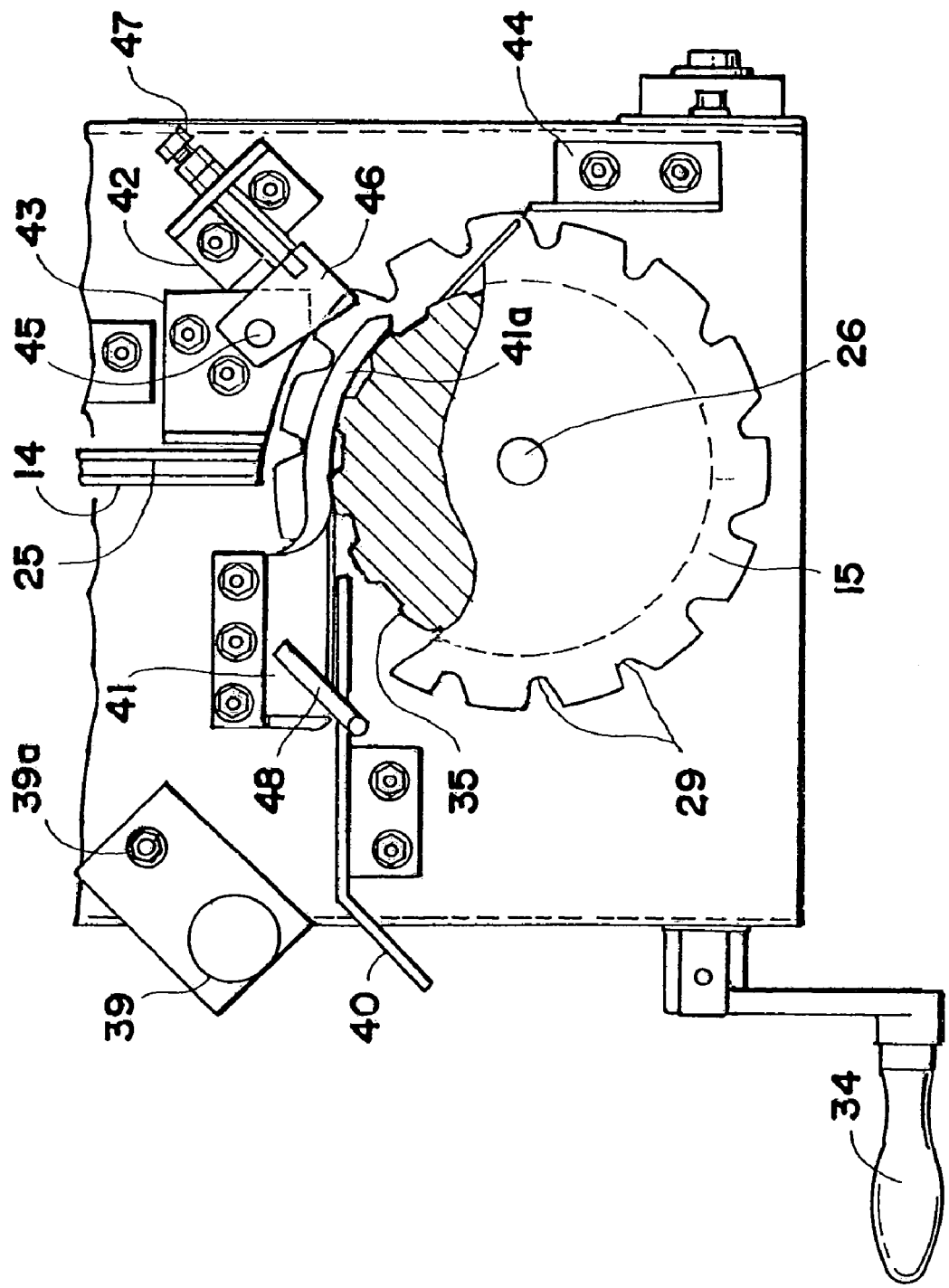
FIG. 5 is a partially cut off plan view showing in detail the vicinity of a rivet wheel of FIG. 1.

The best mode for carrying out the present invention is described with reference to the drawings. FIG. 1 is a plan view conceptually showing a device for loading a rivet and the like in a rivet holder belt. FIG. 2 is a side view showing the device for loading the rivet and the like in the rivet holder belt according to the present invention. FIG. 3 is a partially cut off perspective view of a device for aligning and supplying rivets and the like. FIG. 4 is a perspective view showing main parts of chute and rivet wheel portions. FIG. 5 is a partially cut off plan view showing in detail the vicinity of the rivet wheel of FIG. 1. FIGS. 13(a) and 13(b) are perspective views of a rivet holder belt showing a process of loading rivets and the like step by step.

The present invention obtains a rivet holder belt 36 loaded with rivets 49 and the like as shown in FIG. 13(b) by pushing the rivets 49 and the like in holding notches 37 of the rivet holder belt 36 as shown in FIG. 13(a). In this embodiment, rivets and the like are the rivets 49 composed of head portions 49a and shanks 49b.

In FIGS. 1 through 5, the device for aligning and supplying rivets and the like is composed of a hopper 11, an aligning feeder 12, and a mechanism 13 for lifting and lowering the aligning feeder 12. The rivet aligning and supplying device in this embodiment further has a chute 14 for rivets and the like between the aligning feeder 12 and a rivet wheel 15.

The hopper 11 is shaped like a box with an open top. Outer portions in the width direction of a bottom plate of the hopper 11 are formed on flat faces 16a whereas central portions of the bottom plate are formed on sloped faces 16b, so that rivets and the like thrown in the hopper 11 naturally gather in the central portions. The bottom plate of the hopper 11 has at its center a slit 17 through which the aligning feeder 12 can be lifted and lowered.

The aligning feeder 12 is in plan view shaped like an elongated letter U to have a rivet aligning slit 18. The aligning slit 18 is formed to be wider than a shank of a rivet and the like to be received and is narrower than a head portion of the rivet and the like. Accordingly, head portions of rivets and the like are stopped at the top surface of the aligning slit 18 while shanks of the rivets and the like are hanged in the aligning slit 18 and are supported in an approximately vertical posture by gravity, thus aligning the rivets and the like. The top surface of the aligning feeder 12 is sloped downward to a delivery position of the rivet wheel 15, so that aligned rivets and the like naturally fall by gravity.

Used as the mechanism 13 for lifting and lowering the aligning feeder 12 is a crank mechanism which converts rotational movement of a motor 19 into ascending/descending movement. As shown in FIG. 3, the crank mechanism is composed of a crank arm 22 and a transmission arm 24. The crank arm 22 is attached to a driving shaft 20 and a follower 21 is provided at the tip of the crank arm 22. The transmission arm 24 has a guide groove 23 extending horizontally, and is attached to a side portion on the lower end side of the aligning feeder 12. The follower 21 fits in the guide grove 23. When the driving shaft 20 is driven and rotated in the direction indicated by an arrow c, the crank arm 22 of the crank mechanism rotates in the same direction and the follower 21 moves along the guide groove 23 to push the transmission arm 24 up or pull the arm down. The aligning feeder 12 thus can be lifted and lowered in the direction indicated by an arrow d.

The chute 14 has a slit 25 which is as wide as the aligning slit 18 provided in the aligning feeder 12. As shown in FIGS. 2 and 4, when the aligning feeder 12 is raised to the vicinity of an upper limit position, the slit 25 is connected to the aligning slit 18 to receive rivets and the like from the aligning slit 18. Then, keeping the posture of when the rivets and the like are handed, the slit 25 delivers the rivets and the like to the delivery position to supply the rivet wheel 15 with the rivets and the like.

Figure 7:
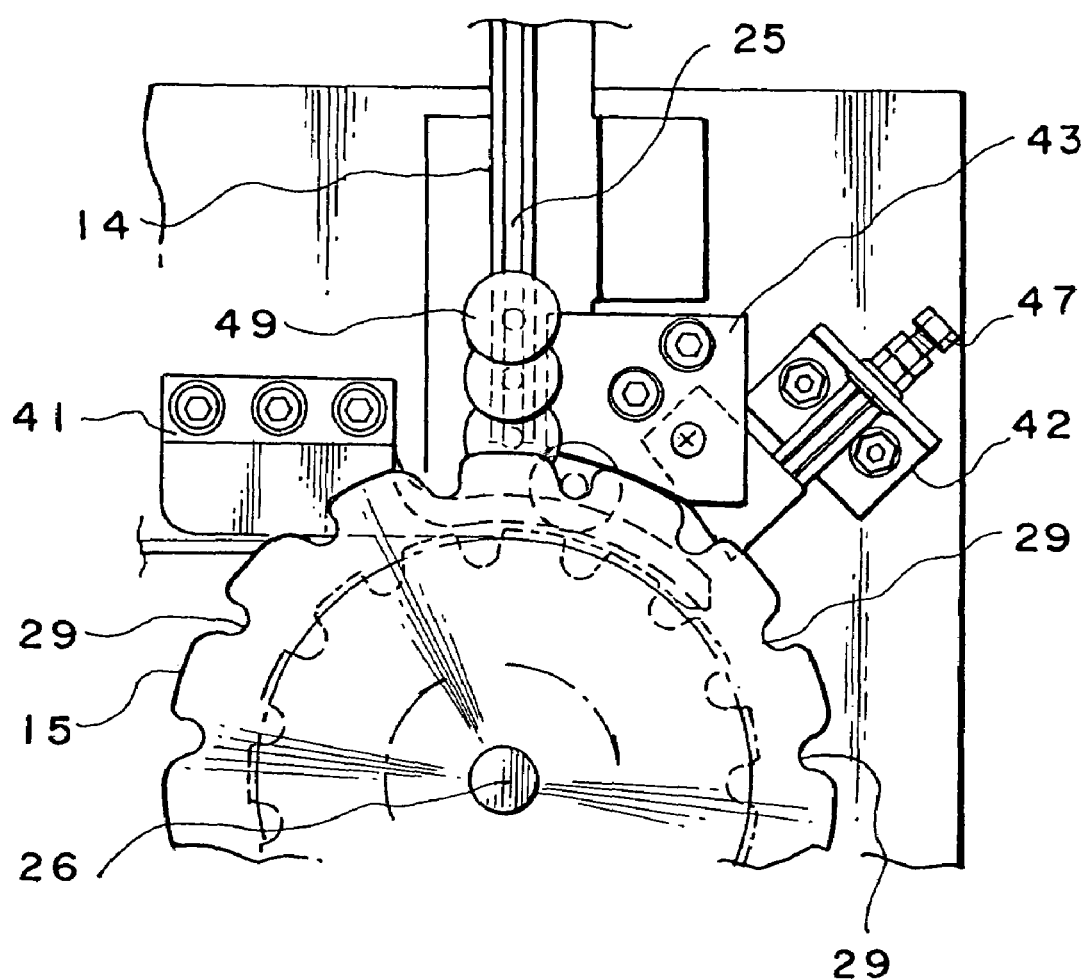
FIG. 7 is a plan view showing a relationship between the chute and the rivet wheel shown in FIG. 1.
Figure 8:
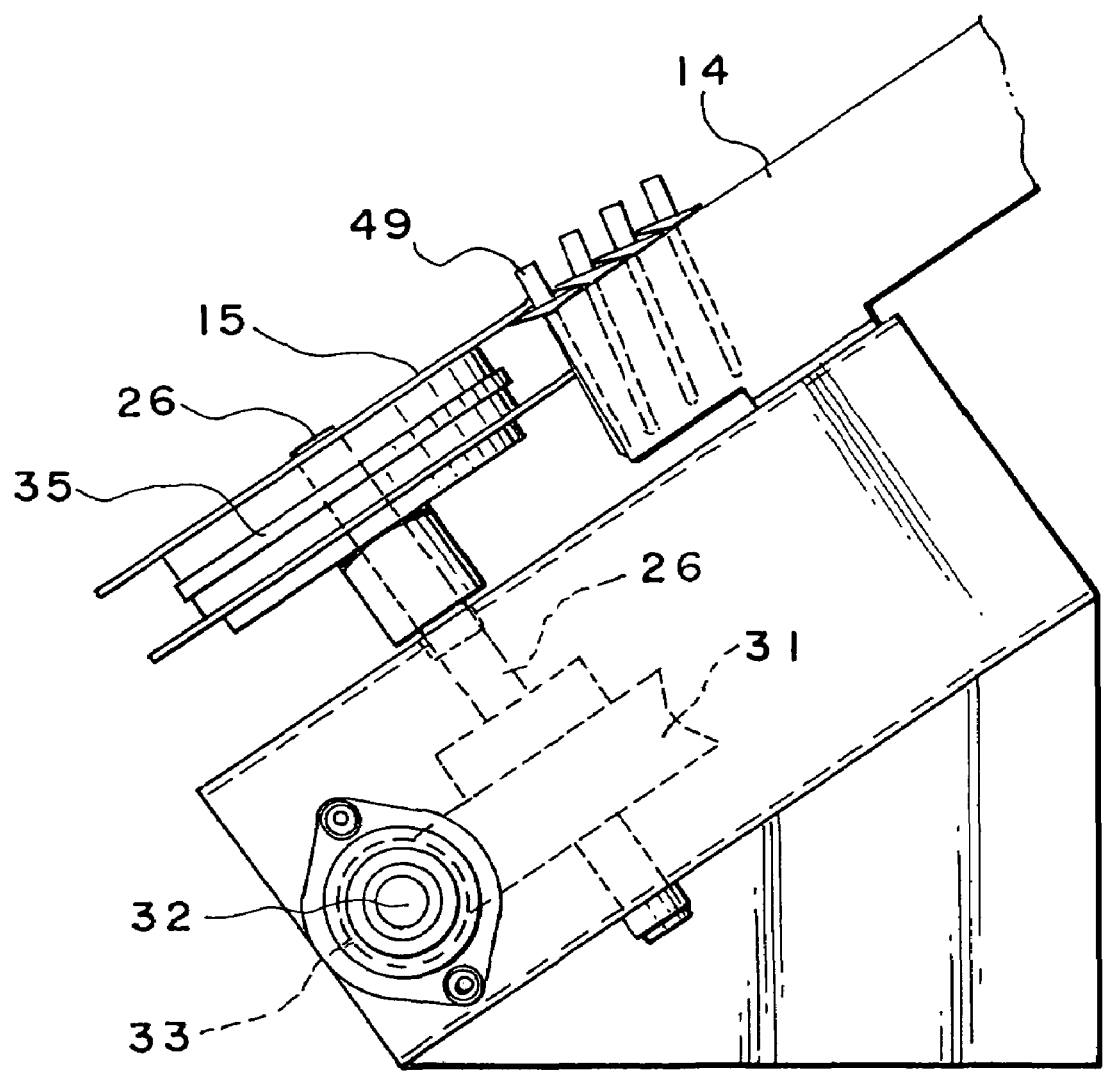
FIG. 8 is a side view with the rivet holder belt omitted, showing a relationship between the chute and the rivet wheel shown in FIG. 1.

FIGS. 7 and 8 show how the rivets 49 and the like that have been guided by the slit 25 of the chute 14 are supplied to the delivery position of the rivet wheel.

Figure 6:
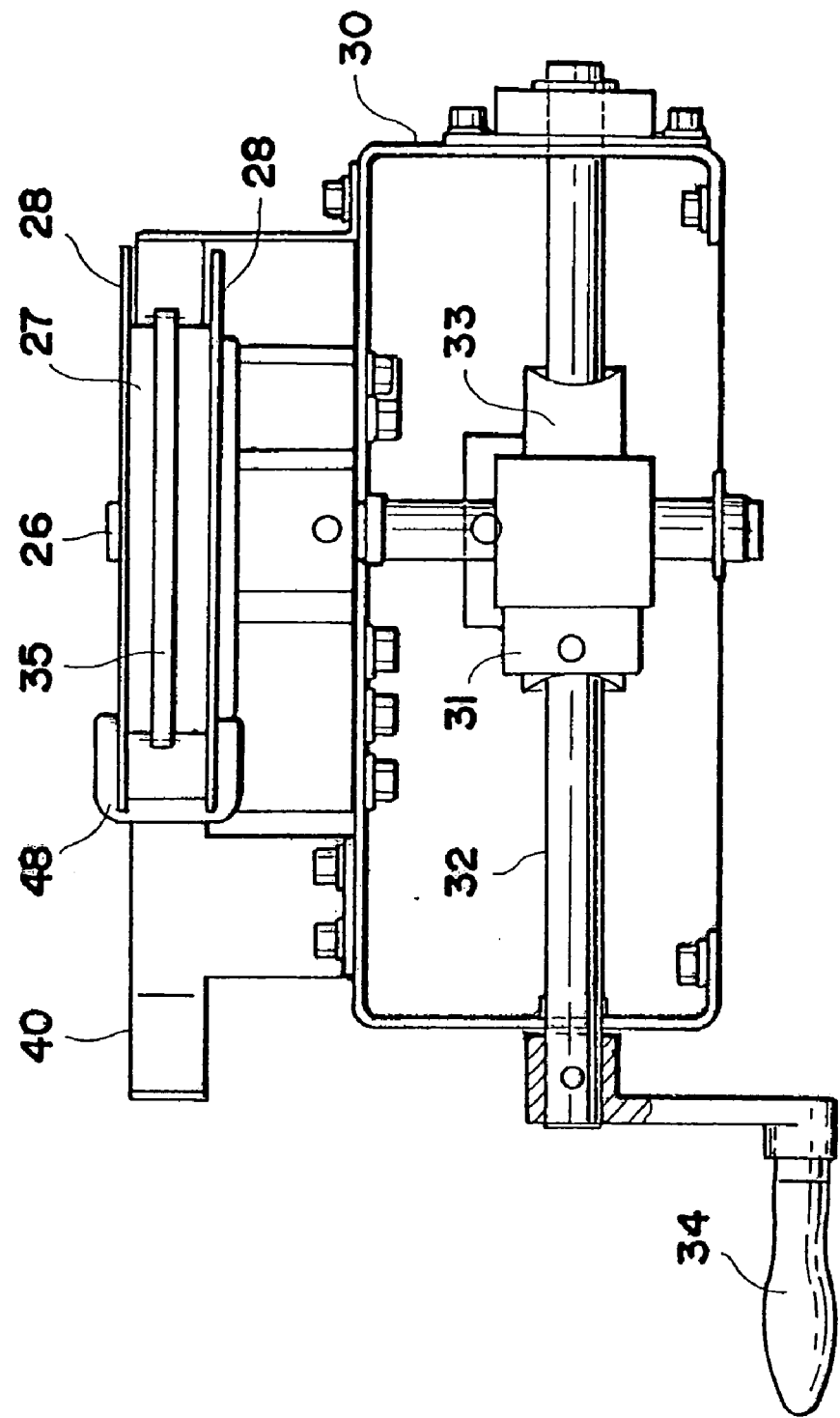
FIG. 6 is a frontal view of the vicinity of the rivet wheel shown in FIG. 1.

The rivet wheel 15 has at its center a wheel shaft 26. A boss type trunk 27 shown in FIGS. 5 and 6 has on its upper and lower ends flanges 28. Rivet engaging grooves (holding grooves) 29 are placed at regular intervals along the rim of each of the flanges 28 in such a manner that the upper grooves and the lower grooves face each other.

The wheel shaft 26 is rotatably supported on a bracket 30. A worm gear 31 is attached to a lower end portion of the wheel shaft 26. The bracket 30 is pierced by a horizontal shaft 32 to support the horizontal shaft 32 rotatably. A worm wheel 33 which meshes with the worm gear 31 is attached to the center of the horizontal shaft 32.

A manually operated handle 34 is attached to one end of the horizontal shaft 32 protruding from the side portions of the bracket 30. By manually rotating the handle 34, rotation of the horizontal shaft 32 is converted into horizontal rotation of the rivet wheel 15 about the wheel shaft 26, which is a vertical shaft. The manually operated handle 34 here may be replaced by a motor. The wheel shaft 26 and the horizontal shaft 32 are each supported by a bearing (not shown in the drawings) for smooth rotation.

Figure 14:
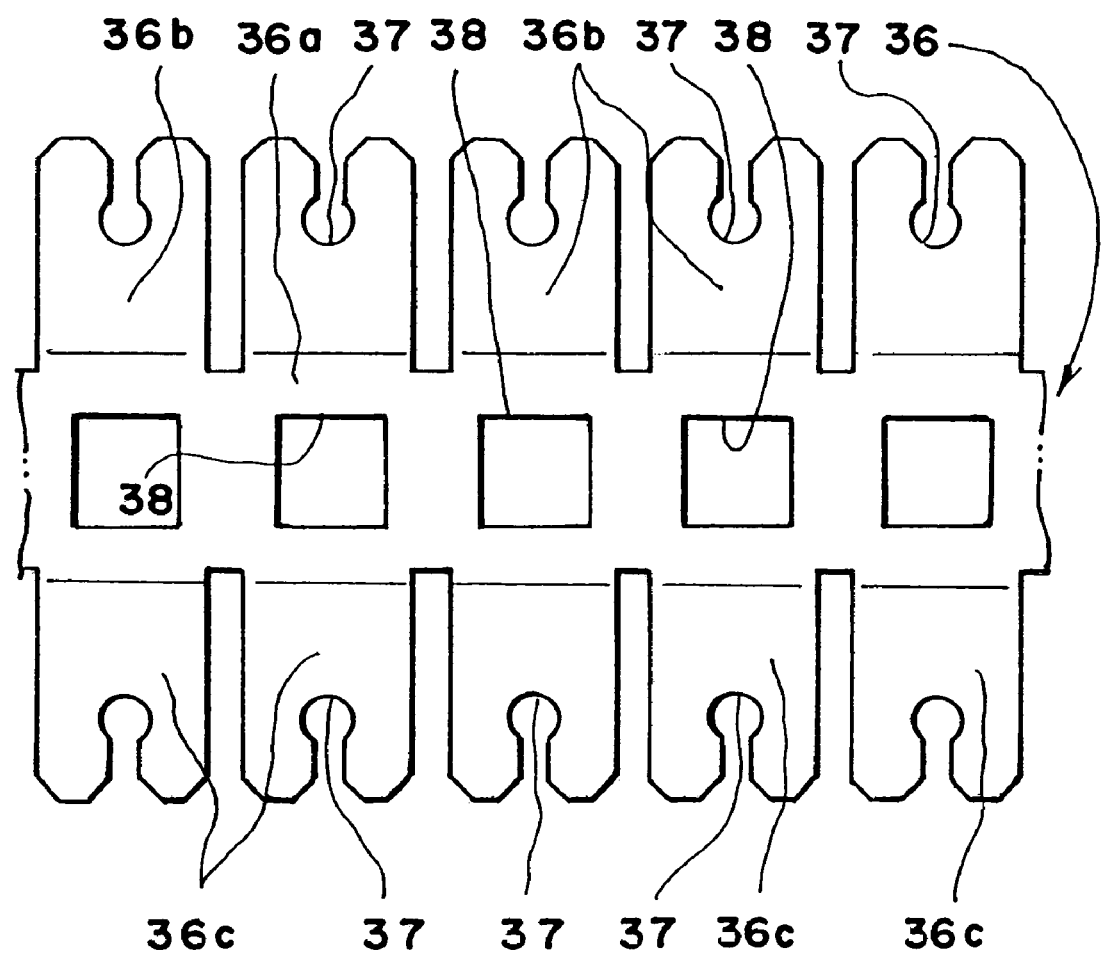
FIG. 14 is a developed view of the rivet holder belt.

A sprocket 35 is provided at the center of the circumference of the trunk 27, and functions to feed the rivet holder belt described later as the rivet wheel 15 is rotated. FIG. 14 is a partially developed frontal view of the rivet holder belt 36. The rivet holder belt 36 has a belt-like portion 36a and bendable upper and lower tabs 36b and 36c which are all unitarily formed. The upper and lower tabs 36b and 36c are formed on both (upper and lower) edges of the belt-like portion 36a and are bendable in an L shape with respect to the belt-like portion. The upper tabs 36b and the lower tabs 36c each have the holding notches 37 at corresponding positions on their edges. Further, the belt-like portion 36a has engagement holes 38 spaced evenly to match the tooth interval of the sprocket 35. The engagement holes 38 are engaged with the teeth of the sprocket 35 to feed the belt-like portion 36*a*. The engagement holes 38 serve as rivet holder belt feeding holes when used in a riveter. The rivet wheel 15 and the sprocket 35 are placed such that, as regards the positional relation between the grooves 29 of the rivet wheel 15 and the teeth of the sprocket 35, when the engagement holes 38 of the rivet holder belt 36 mesh with the teeth of the sprocket 35, the grooves 29 of the rivet wheel 15 and the holding notches 37 of the rivet holder belt 36 come into alignment with each other.

Figure 9:
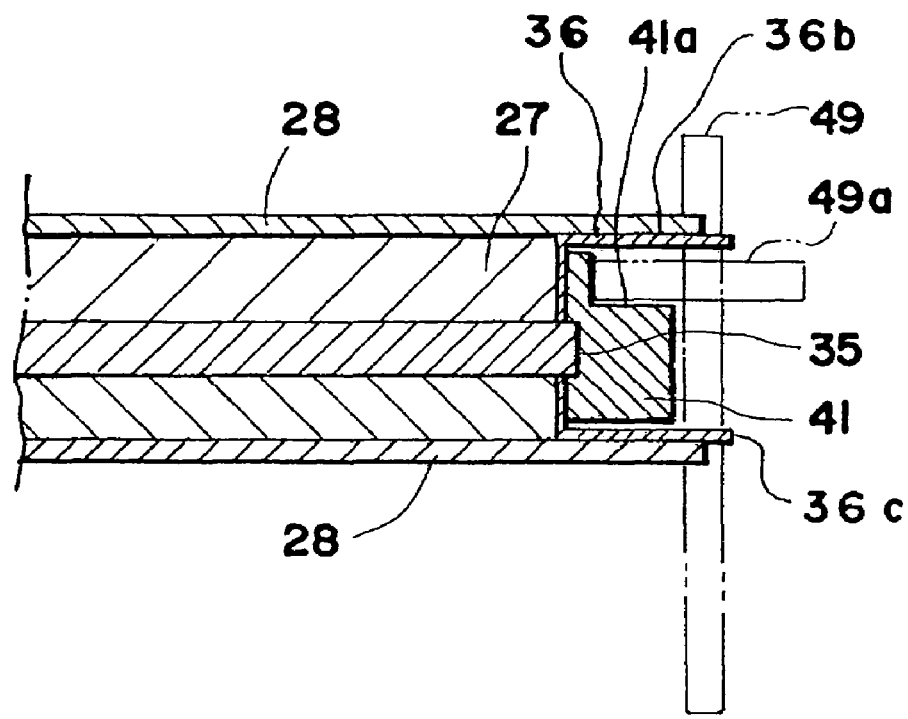
FIG. 9 is a sectional view showing a relation among the rivet wheel, a rivet holder belt, and rivets and the like in FIG. 1.
Figure 13:
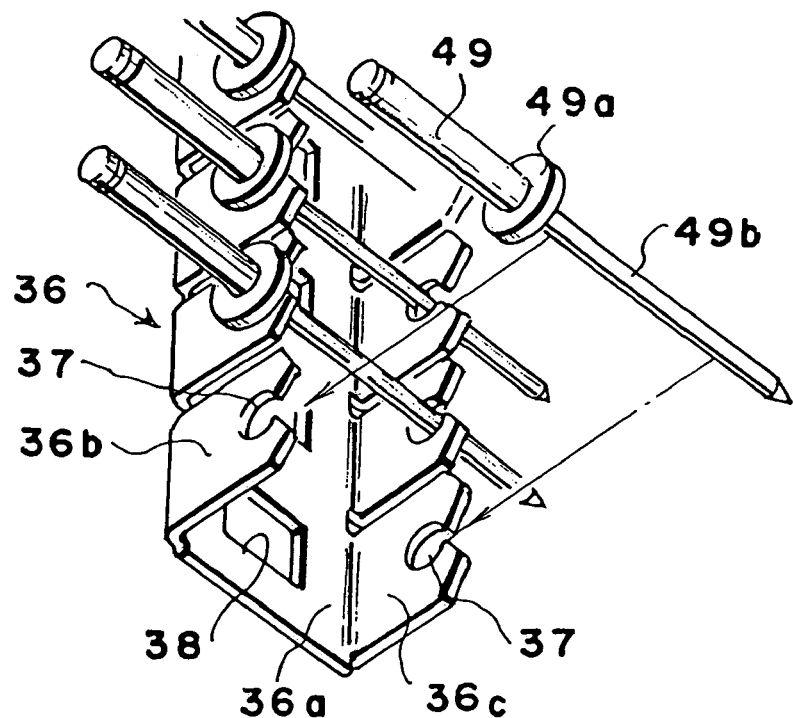
FIGS. 13(a) and 13(b) are perspective views of the rivet holder belt showing a process of loading rivets and the like step by step.
Figure 13:
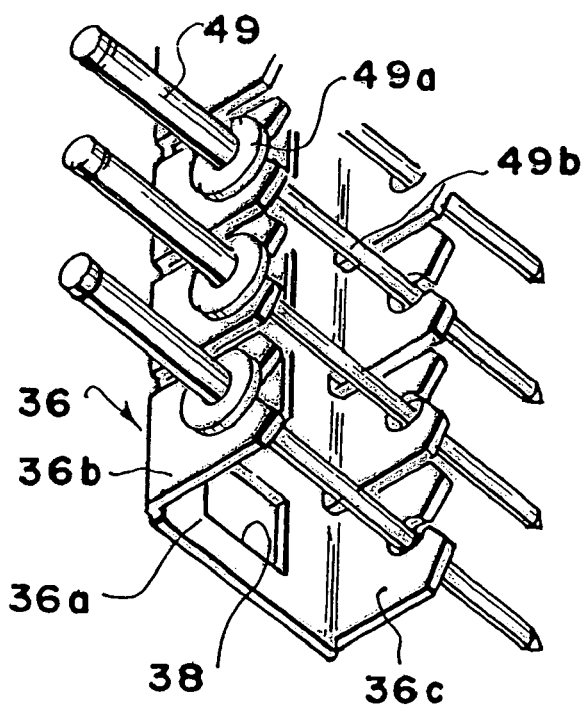

Arranged in the vicinity of the rivet wheel 15 are a guide post 39, a guide bracket 40, a metallic bender 48, a positioning regulating member 41, a pushing member 42, a rivet guide 43, and a holder belt disengaging bracket 44 as shown in FIG. 5. The guide post 39 can rotate horizontally about an axis 39*a*. The guide bracket 40 is bent on one end to form a slope and guide the rivet holder belt 36 between the guide post 39 and the guide bracket 40. The metallic bender 48 is provided at one position along the guide bracket 40 and bends the rivet holder belt 36 that is developed as shown in FIG. 14 to obtain the rivet holder belt 36 that is C-shaped in section as shown in FIG. 13. The positioning regulating member 41 is provided to face the trunk 27. The regulating member 41 presses the rivet holder belt 36 against the trunk 27 in a region from a position where rivets and the like are received from the chute 14 to a position immediately in front of the pushing member 42 while guiding the rivet 49 and the like by supporting the head portions 49*a* of the rivets 49 and the like as shown in FIG. 9 in conjunction with rotation of the rivet wheel 15. The pushing member 42 pushes rivets and the like that are in the grooves 29 of the rivet wheel 15 into the holding notches 37 of the rivet holder belt 36. The rivet guide 43 pushes the received rivets 49 and the like into the grooves (holding grooves) 29. The tip of the holder belt disengaging bracket 44 is opposed to the circumference of the trunk 27 from a short distance as shown in FIGS. 4 and 5.

Figure 12:
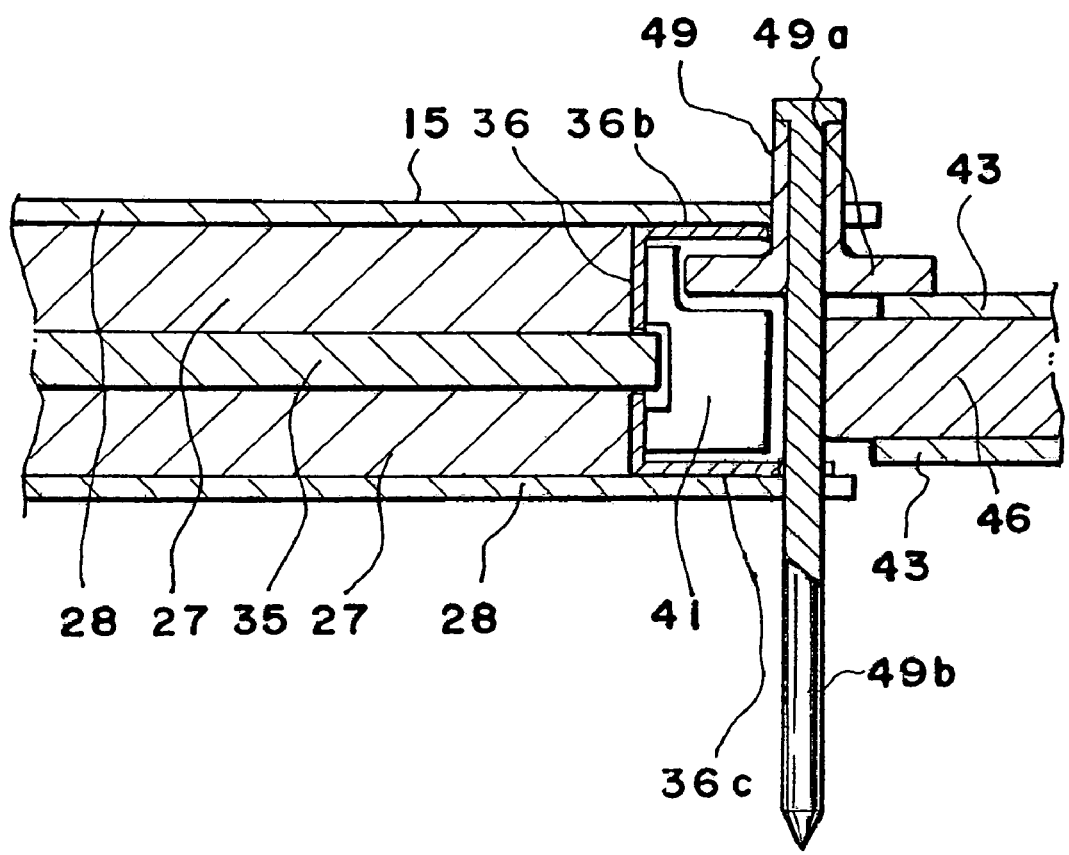
FIG. 12 is a sectional view showing a rivet and the like being pushed into the rivet holder belt by the rotary member that serves as the pushing member.

The regulating member 41 has a guide notch 41*a* to support the head portions 49*a* of the rivets 49 and the like. The regulating member 41 is to regulate the positions of the rivets 49 and the like to fix the position where the rivets 49 and the like are loaded in the rivet holder belt 36. Even when received in the grooves 29 of the rivet wheel 15, the rivets 49 and the like may still move within the groove 29, thereby causing misalignment. To prevent this, the regulating member 41 is positioned between the upper and lower tabs 36*b* and 36*c* of the passing rivet holder belt 36 so that the head portions 49*a* of the rivets 49 and the like are engaged with the guide notch 41*a* as shown in FIGS. 9 and 12. The rivets 49 and the like are thus held in a fixed position.

The pushing member 42 has a rotary member 46 and a push amount adjusting member 47. The rotary member 46 rotates about an axis 45. The push-amount adjusting member 47 uses the rotary member 46 to fit the rivets 49 and the like in the holding notches 37 of the rivet holder belt 36.

Next, the operation of the device structured as above is described. First, a large number of rivets 49 such as blind rivets or nails are thrown in the hopper 11 at random. The rivets 49 and the like run down the slopes 16*b* in the hopper 11 and gradually gather in the central portions. Then the motor 19 is started to turn the crank arm 22 of the lifting mechanism 13. The follower 21 at the tip of the crank arm 22 moves in the guide groove 23 of the transmission arm 24, thereby lifting and lowering the transmission arm 24.

Accordingly, the aligning feeder 12 to which the transmission arm 24 is attached ascends and descends through the slit 17 of the hopper 11 in the direction indicated by the arrow d. Through this operation, the rivets 49 and the like around the central portions of the hopper 11 are scooped up by the aligning slit 18. At this time, as shown in FIGS. 2 and 8, the head portions 49*a* of the rivets 49 and the like are supported by the top surface of the aligning feeder 12 while the shanks 49*b* vertically hang in the slit to be aligned.

The thus aligned rivets 49 and the like slide down the sloping top surface of the aligning feeder 12 due to their own weights and move into the slit 25 of the chute 14. As shown in FIGS. 2 and 8, the rivets 49 and the like that have moved to the chute 14 are delivered continuously to the delivery position where the rivets 49 and the like are handed to the rivet wheel 15.

The rivet wheel 15 is opposed to the exit of the chute 14 from a short distance. The rivet wheel 2 is rotated by the manually operated handle 34 which is provided separately from the motor 19, so that the rivets 49 and the like fed from the chute 14 can be put one by one into the grooves 29 of the rivet wheel 15.

That is, as shown in FIGS. 7 and 8, the rivets 49 and the like thus fed from the aligning feeder 12 are aligned in and guided by the slit 25 of the chute 14 to be supplied to the delivery position of the rivet wheel 15. As the grooves 29 of the rivet wheel 15 being rotated pass the position of the rivets 49 and the like thus supplied while being guided by the slit 25 of the chute 14, the one of the rivets 49 and the like which is located at the most forward end of the chute 14 is received by one of the grooves 29. Then, the next one of the rivets 49 and the like aligned in the slit 25 moves to the most forward end position, and the rivet 49 and the like is held in abutment with the peripheral edge of the rivet wheel 15 and wait in stand-by at that position until the next one of the grooves 29 of the rivet wheel 15 reaches the position as it rotates; as the groove 29 of the rivet wheel 15 passes the position, the rivet 49 and the like is received by the groove 29. Thereafter, the rivets 49 and the like are successively supplied into the grooves 29 of the rivet wheel 15 in the same manner as described above.

On the other hand, the rivet holder belt 36 that is developed as shown in FIG. 14 is guided and delivered along the guide post 39 and the guide bracket 40. Upon reaching the metallic bender 48, the rivet holder belt 36 is bent to have a C-shaped section as shown in FIGS. 4 and 13(*a*) and 13(*b*). In this state, as shown in FIG. 9, the rivet holder belt 36 moves between the upper flange 28 and the lower flange 28 of the rivet wheel 15 with the upper and lower tabs 36*b* and 36*c* facing outward.

At this time, the rivet holder belt 36 moving between the upper flange 28 and the lower flange 28 of the rivet wheel 15 with the upper and lower tabs 36*b* and 36*c* facing outward has its belt-like portion 36*a* held down by the regulating member 41 that is positioned between the upper tabs 36*b* and the lower tabs 36*c* since the regulating member 41 extends facing the trunk 27 of the rivet wheel 15. Therefore, the rivets 49 and the like stored in the grooves 29 of the rivet wheel 15 are guided under positional regulation while the head portions 49*a* of the rivets 49 and the like are engaged with the guide notch 41*a* of the regulating member 41 as shown in FIGS. 9 and 12.

Further, the engagement holes 38 are provided in the belt-like portion 36*a* of the rivet holder belt 36. While the rivet holder belt 36 is moving, its belt-like portion 36*a* is in contact with the trunk 27 of the rivet wheel 15 and the engagement holes 38 of the belt-like portion 36*a* are engaged with the teeth of the sprocket 35. At this time, the rivet wheel 15 and the sprocket 35 are placed such that, as regards the positional relation between the grooves 29 of the rivet wheel 15 and the teeth of the sprocket 35, when the engagement holes 38 of the rivet holder belt 36 mesh with the teeth of the sprocket 35, the grooves 29 of the rivet wheel 15 and the holding notches 37 of the rivet holder belt 36 come into alignment with each other. Accordingly, as the rivet wheel 15 is rotated to move the rivet holder belt 36, the grooves 29 of the rivet wheel 15 and the holding notches of the rivet holder belt 36 are brought into accurate alignment with each other, thereby making it possible to move the rivet holder belt 36. The rivet wheel 15 and the rivet holder belt 36 are therefore automatically positioned. In this way, rotation of the rivet wheel 15 is directly and securely transmitted to the rivet holder belt 36 without the fear of the rivet wheel slipping on the rivet holder belt.

As the rivet holder belt 36 is moved further in conjunction with rotation of the sprocket 35, the rivet guide 43 guides the rivets 49 and the like on the rivet wheel 15 to the rivet holder belt 36 side. Then, the rotary member 46 of which the amount of rotation is set by the pushing member 42 pushes the rivets 49 and the like into the holding notches 37 of the rivet holder belt 36 to fit the rivets and the like in the holding notches. The angle of rotation of the rotary member 46 about the axis 45 can be adjusted by operating the push amount adjusting member 47 of the pushing member 46. This makes it possible to adjust arbitrarily the pushing pressure and the push amount with and by which the rivets 49 and the like are pushed into the holding notches 37 in accordance with the size, shape, and the like of the rivets 49 and the like.

Figure 10:
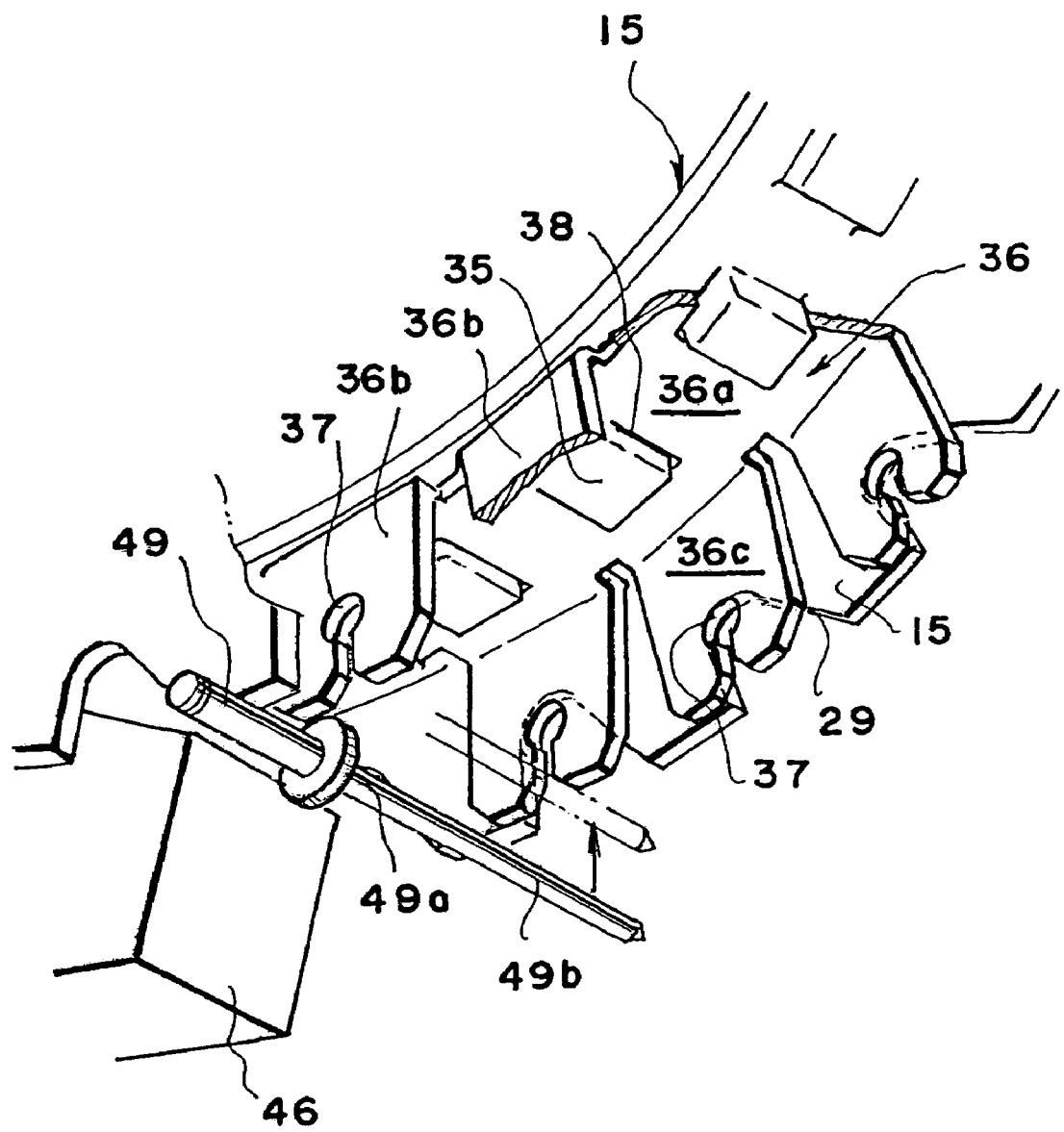
FIG. 10 is a partial perspective view with a regulating member removed which shows a rivet and the like immediately before the rivet and the like reach a rotary member that serves as a pushing member.
Figure 11:
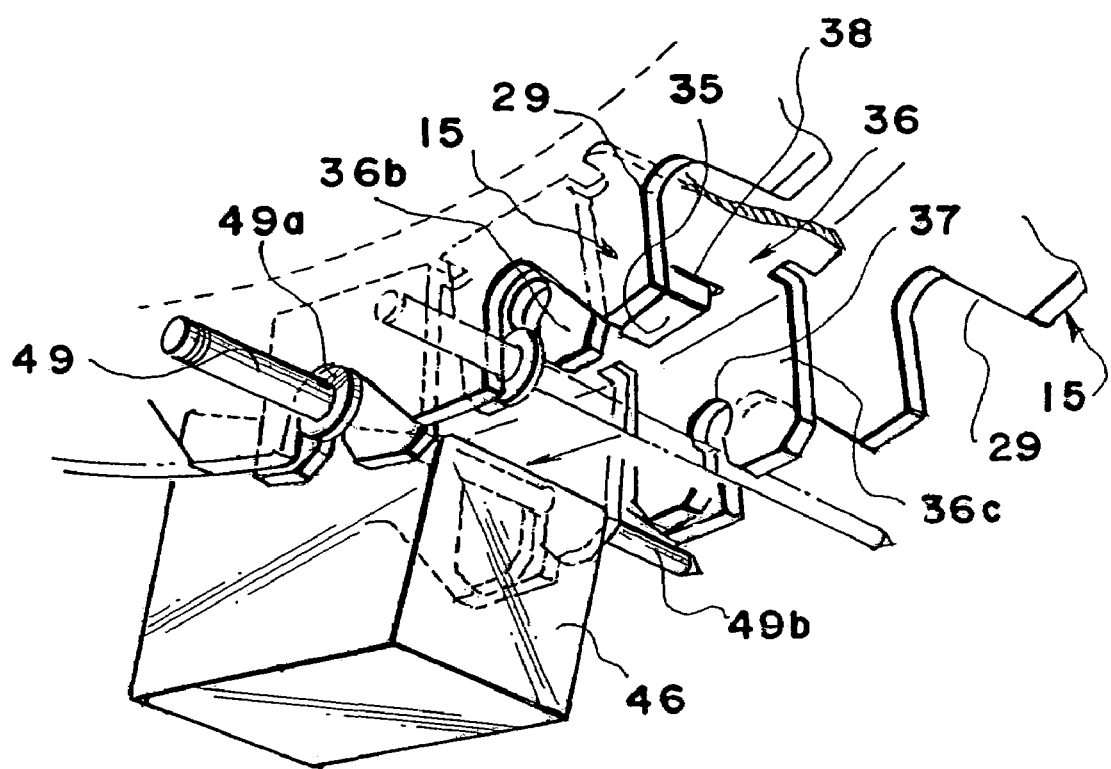
FIG. 11 is a partial perspective view with the regulating member removed which shows a rivet and the like being pushed into the rivet holder belt by the rotary member that serves as the pushing member.

How the rivets 49 and the like are loaded in the rivet holder belt 36 at this time is shown in FIGS. 10 and 11. FIG. 10 is a partial perspective view showing a rivet and the like immediately before the rivet and the like reach the rotary member that serves as the pushing member. FIG. 11 is a partial perspective view showing a rivet and the like being pushed into the rivet holder belt by the rotary member that serves as the pushing member. The regulating member is omitted from FIGS. 10 and 11. FIG. 12 is a sectional view showing a rivet and the like being pushed into the rivet holder belt by the rotary member that serves as the pushing member.

The rivets 49 and the like that are put in the grooves 29 and 29 of the rivet wheel 15 as shown in FIG. 9 and positioned at the entrance of the holding notches 37 of the rivet holder belt 36 under positional regulation by the regulating member 41 move together with the rivet holder belt 36 as the rivet wheel 15 rotates. At this time, upon reaching the rotary member 46 of the pushing member 42 as shown in FIGS. 10 and 11, the rivets 49 and the like are pushed into the holding notches 37 of the rivet holder belt 36 due to a sloped face of the rotary member 46. The rivets 49 and the like are thus fit in the holding notches 37.

In this way, the rivets 49 and the like are loaded in the rivet holder belt 36 in sequence to obtain the rivet holder belt 36 that is loaded with the rivets 49 and the like and is usable in a riveter.

While a specific embodiment of the invention has been shown and described in detail to illustrate the application of the principles of the invention, it will be understood that the invention may be embodied otherwise without departing from such principles.

INDUSTRIAL APPLICABILITY

The device for loading a rivet and the like in the rivet holder belt according to the present invention is capable of continuously loading the rivet holder belt with blind rivets and is also capable of loading continuously nails or screws in the holder belt.

The invention claimed is:

1. A device for loading a rivet and the like in a rivet holder belt, the device comprising:
   a hopper for storing a set of rivets and the like at random;
   a chute which is continuous from the hopper to guide the rivets and the like that are contained in the hopper to a delivery position of a rivet wheel;
   the rivet wheel having flange bodies with grooves formed on an outer rim periphery of said flange bodies, said rivet wheel rotates to receive the rivets and the like from a lower end of the chute and stores the rivets and the like one by one in each of said grooves;
   a pushing member which is provided to face a circumference of the rivet wheel to push the rivets and the like stored in the grooves of the rivet wheel into holding notches of a rivet holder belt that is guided along the rivet wheel; and
   a sprocket which is provided in a trunk of the rivet wheel and feeds the rivet holder belt while engaging with a plurality of engagement holes that are opened along a length of the rivet holder belt, wherein the rivet wheel and the sprocket are placed so that, a grooves-notches aligning means is defined by said engagement holes and a plurality of teeth on said sprocket forming a positional relation between the grooves of the rivet wheel and the teeth of the sprocket, when the engagement holes of the rivet holder belt mesh with the teeth of the sprocket, the grooves of the rivet wheel and the holding notches of the rivet holder belt come into alignment with each other.

2. A device for loading a rivet and the like in a rivet holder belt according to claim 1, further comprising a regulating member that stretches over an area from a position in a vicinity of the rivet wheel where the rivets and the like are received to a position where the rivets and the like are handed over to the rivet holder belt, the regulating member facing the trunk of the rivet wheel and supporting head portions of the rivets and the like that are positioned in the grooves of the rivet wheel and at entrances of the holding notches of the rivet holder belt, regulating positions of the head portions of the rivets and the like to guide the rivets and the like.

3. A device for loading a rivet and the like in a rivet holder belt according to claim 1, wherein the pushing member is provided with a push amount adjusting member for adjusting a push amount by which the rivets and the like are to be pushed into the holding notches of the rivet holder belt.

4. A device for loading a rivet and the like in a rivet holder belt, the device comprising:
   a hopper for storing a set of rivets and the like at random;
   an aligning feeder which has an aligning slit and which is driven to ascend and descend through the hopper, the aligning slit supporting head portions of the rivets and the like while shanks of the rivets and the like are hung in the aligning slit;
   a chute which has a slit extending continuous from the aligning slit and which guides the rivets and the like downward;
   a rivet wheel having flange bodies, said rivet wheel rotates to receive the rivets and the like from a lower end of the chute and stores the rivets and the like one by one in each of grooves that are formed in rims of said flange bodies;

a pushing member which is provided to face a circumference of the rivet wheel to push the rivets and the like stored in the grooves of the rivet wheel into holding notches of a rivet holder belt that is guided along the rivet wheel; and a grooves-notches aligning means defined by engagement holes that are opened along a length of the rivet holder belt and a plurality of teeth on a sprocket, said sprocket being provided in a trunk of the rivet wheel and feeds the rivet holder belt while engaging with said engagement holes, wherein the rivet wheel and the sprocket are placed so that, as regards a positional relation between the grooves of the rivet wheel and teeth of the sprocket, when the engagement holes of the rivet holder belt mesh with the teeth of the sprocket, the grooves of the rivet wheel and the holding notches of the rivet holder belt come into alignment with each other.

5. A device for loading a rivet and the like in a rivet holder belt according to claim 4, wherein the aligning feeder and the rivet wheel are driven by separate driving forces.

6. A device for loading a rivet and the like in a rivet holder belt according to claim 5, wherein the aligning feeder is driven by a motor whereas the rivet wheel is driven by manipulation of a handle.

7. A device for loading a rivet and the like in a rivet holder belt according to claim 4, further comprising a regulating member that stretches over an area from a position in a vicinity of the rivet wheel where the rivets and the like are received to a position where the rivets and the like are handed over to the rivet holder belt, the regulating member facing the trunk of the rivet wheel and supporting said head portions of the rivets and the like that are positioned in the grooves of the rivet wheel and at entrances of the holding notches of the rivet holder belt, regulating positions of the head portions of the rivets and the like to guide the rivets and the like.

8. A device for loading a rivet and the like in a rivet holder belt according to claim 4, wherein the pushing member is provided with a push amount adjusting member for adjusting a push amount by which the rivets and the like are to be pushed into the holding notches of the rivet holder belt.

9. A device for loading a rivet and the like in a rivet holder belt, the device comprising:

a hopper for storing a set of rivets and the like at random;

a feeder means including an aligning slit ascendable by a lift through said hopper, upper two sides of said slit supporting head portions of the rivets and the like, and an inner guide of said aligning slit accommodating shank portions of the rivets and the like, said feeder means including a chute extending continuous from said aligning slit to guide said rivets and the like downward;

a rivet wheel rotatable around an axis of a wheel shaft with a top portion and a trunk, a sprocket with teeth provided on said trunk and a substantially circular flange body provided on said top portion, said rivet wheel having a plurality of rivet engaging grooves around a perimeter edge of said flange body to receive the rivets and the like from said feeder means;

a rivet holder belt with an upperside and a waist side, a plurality of holding notches provided on said upperside, and a set of engagement holes provided on said waist side, wherein said holding notches are brought into alignment with said grooves to feed said rivet holder belt as said teeth come into alignment with said engagement holes to define a grooves-notches aligning means; and a pushing member provided to face the perimeter edge of said rivet wheel to push the rivets and the like stored in said grooves into said holding notches.

10. A device for loading a rivet and the like in a rivet holder belt according to claim 9, wherein said feeder means and said rivet wheel are driven by separate driving forces.

11. A device for loading a rivet and the like in a rivet holder belt according to claim 10, wherein said feeder means is driven by a motor whereas said rivet wheel is driven by manipulation of a handle.

12. A device for loading a rivet and the like in a rivet holder belt according to claim 9, further comprising a regulating member that stretches over an area from a position in a vicinity of said rivet wheel where the rivets and the like are received to a position where the rivets and the like are handed over to said rivet holder belt, said regulating member facing said trunk and supporting the head portions of the rivets and the like that are positioned in said grooves and at entrances of said holding notches, regulating positions of said head portions of the rivets and the like to guide the rivets and the like.

13. A device for loading a rivet and the like in a rivet holder belt according to claim 9, wherein said pushing member is provided with a push amount adjusting member for adjusting a push amount by which the rivets and the like are to be pushed into said holding notches of said rivet holder belt.

* * * * *